US010754958B1

(12) United States Patent
Sidagni

(10) Patent No.: US 10,754,958 B1
(45) Date of Patent: Aug. 25, 2020

(54) VULNERABILITY RISK MITIGATION PLATFORM APPARATUSES, METHODS AND SYSTEMS

(71) Applicant: NopSec Inc., New York, NY (US)

(72) Inventor: Michelangelo Sidagni, New York, NY (US)

(73) Assignee: NopSec Inc., New York, NY (US)

( * ) Notice: Subject to any disclaimer, the term of this patent is extended or adjusted under 35 U.S.C. 154(b) by 275 days.

(21) Appl. No.: 15/709,172

(22) Filed: Sep. 19, 2017

Related U.S. Application Data

(60) Provisional application No. 62/396,545, filed on Sep. 19, 2016.

(51) Int. Cl.
*G06F 11/00* (2006.01)
*G06F 21/57* (2013.01)
*G06F 21/55* (2013.01)
G06F 12/14 (2006.01)
H04L 29/06 (2006.01)
G06F 21/56 (2013.01)

(52) U.S. Cl.
CPC .......... *G06F 21/577* (2013.01); *G06F 21/552* (2013.01); *G06F 21/56* (2013.01); *H04L 63/1433* (2013.01)

(58) Field of Classification Search
CPC .... G06F 21/31; G06F 16/83; G06F 17/30923; H04L 63/20; H04L 63/08; H04L 63/083; H04L 63/102; H04L 63/1433
USPC .................................................. 726/1, 25, 26
See application file for complete search history.

(56) References Cited

U.S. PATENT DOCUMENTS

| | | | | |
|---|---|---|---|---|
| 9,354,782 | B2* | 5/2016 | Gorod | G06F 16/21 |
| 2014/0067973 | A1* | 3/2014 | Eden | H04L 51/32 |
| | | | | 709/206 |
| 2014/0189873 | A1* | 7/2014 | Elder | H04L 63/1433 |
| | | | | 726/25 |
| 2015/0178341 | A1* | 6/2015 | Kumar | G06Q 30/06 |
| | | | | 707/738 |
| 2015/0324559 | A1* | 11/2015 | Boss | H04L 63/08 |
| | | | | 726/1 |

(Continued)

*Primary Examiner* — Gary S Gracia
(74) *Attorney, Agent, or Firm* — Norton Rose Fulbright US LLP

(57) ABSTRACT

The VULNERABILITY RISK MITIGATION PLATFORM APPARATUSES, METHODS AND SYSTEMS ("VRMP") transforms vulnerability risk info request, malware correlation analysis request, social media mentions analysis request, and, asset risk analysis request inputs via VRMP components into vulnerability risk info, CVE data, social media mentions risk score, and, asset risk score outputs. A vulnerability risk info request for a network environment may be obtained. A security vulnerability affecting assets associated with the network environment may be determined. A base vulnerability risk score for the security vulnerability may be determined and augmented based on calculated public exploits availability score, malware correlation score, social media mentions risk score, and overall asset risk score to determine an augmented vulnerability risk score. Vulnerability risk information regarding the security vulnerability may be provided in accordance with the augmented vulnerability risk score.

20 Claims, 9 Drawing Sheets

EXEMPLARY VRMP VULNERABILITY RISK SCORE PROVIDING (VRSP) COMPONENT

(56) References Cited

U.S. PATENT DOCUMENTS

| | | | |
|---|---|---|---|
| 2015/0332067 A1* | 11/2015 | Gorod | G06F 16/9535 |
| | | | 726/26 |
| 2016/0071517 A1* | 3/2016 | Beaver | G06F 40/30 |
| | | | 704/9 |
| 2016/0162986 A1* | 6/2016 | Ghosh | G06Q 40/00 |
| | | | 705/35 |
| 2017/0061133 A1* | 3/2017 | Trabelsi | G06F 21/577 |
| 2017/0171236 A1* | 6/2017 | Ouchn | H04L 63/1433 |

* cited by examiner

EXEMPLARY VRMP VULNERABILITY RISK SCORE PROVIDING (VRSP) COMPONENT

EXEMPLARY VRMP MALWARE CORRELATION DETERMINING (MCD) COMPONENT

EXEMPLARY VRMP SOCIAL MEDIA MENTIONS DETERMINING (SMMD) COMPONENT

EXEMPLARY VRMP ASSET RISK SCORE DETERMINING (ARSD) COMPONENT

EXEMPLARY VRMP SCREENSHOT

FIGURE 8 — EXEMPLARY VRMP SCREENSHOT

VULNERABILITY RISK MITIGATION PLATFORM APPARATUSES, METHODS AND SYSTEMS

CROSS-REFERENCE TO RELATED APPLICATIONS

This application claims the benefit of U.S. Provisional Patent Application No. 62/396,545 entitled, "VULNERABILITY RISK MITIGATION PLATFORM APPARATUSES, METHODS AND SYSTEMS," filed on Sep. 19, 2016, which is expressly incorporated by reference herein in its entirety.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

TECHNICAL FIELD

The present innovations generally address vulnerability risk mitigation platforms, and more particularly, include VULNERABILITY RISK MITIGATION PLATFORM APPARATUSES, METHODS AND SYSTEMS (hereinafter "VRMP").

BACKGROUND

Software and hardware vulnerabilities may pose a critical risk to environments and data of individuals and companies using computerized systems. Public exploits that may be utilized to take advantage of security vulnerabilities may be available for certain security vulnerabilities. Malware that facilitates taking advantage of security vulnerabilities may be available for certain security vulnerabilities.

Categorizing and mitigating the security risk can be a daunting task for any company. Attempts to categorize the severity of a vulnerability have been made. Once such attempt includes using a Common Vulnerability Scoring System (CVSS). The CVSS attempts to capture the principal characteristics of a vulnerability, and produces a numerical score reflecting its severity, as well as a textual representation of that score. The numerical score may be translated into a qualitative representation of the vulnerability severity, such as low, medium, high, and critical. The CVSS system, however, does not consider all information related to a particular vulnerability and thus, it is often unrefined.

BRIEF SUMMARY OF THE INVENTION

In various embodiments, a VRMP is provided that facilitates vulnerability risk mitigation by identifying, classifying, prioritizing, patching, and/or the like with respect to security vulnerabilities in a network environment. In certain embodiments, the VRMP includes a memory and at least one processor configured to execute instructions to obtain a request for vulnerability risk information associated with a network environment, and to determine a security vulnerability affecting assets associated with the network environment. The at least one processor is also configured to execute instructions to determine a base vulnerability risk score for the security vulnerability, and to augment the base vulnerability risk score based on at least one augmenting factor. The augmenting factors may include a public exploits availability score, a malware correlation score, a social media mentions risk score, and/or an overall asset risk score. The at least one processor of the VRMP of certain embodiments is also configured to execute instructions to provide vulnerability risk information regarding the security vulnerability in response to the request. The vulnerability risk information includes a vulnerability risk factor based on the augmented vulnerability risk score of the security vulnerability In some embodiments, a social media mentions determining (SMMD) apparatus for calculating a social media mentions risk score (SMMRS) is provided. In some aspects, the SMMD apparatus includes a memory and at least one processor configured to execute instructions to obtain a request for social media mentions analysis associated with a security vulnerability affecting assets of a network environment. The at least one processor is also configured to execute instructions to retrieve social media data that may include social media mentions associated with the security vulnerability, to determine information related to the social media mentions associated with the security vulnerability, and to calculate the SMMRS based on the information related to the social media mentions. In some embodiments, the information related to the social media mentions includes at least one of a number of social media mentions, a duration associated with social media mentions, an indicator of how recent the social media mention is, and a geographic dispersion of the social media mentions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying appendices and/or drawings illustrate various non-limiting, example, innovative aspects in accordance with the present descriptions.

DETAILED DESCRIPTION

VRMP Controller

Figure 9:
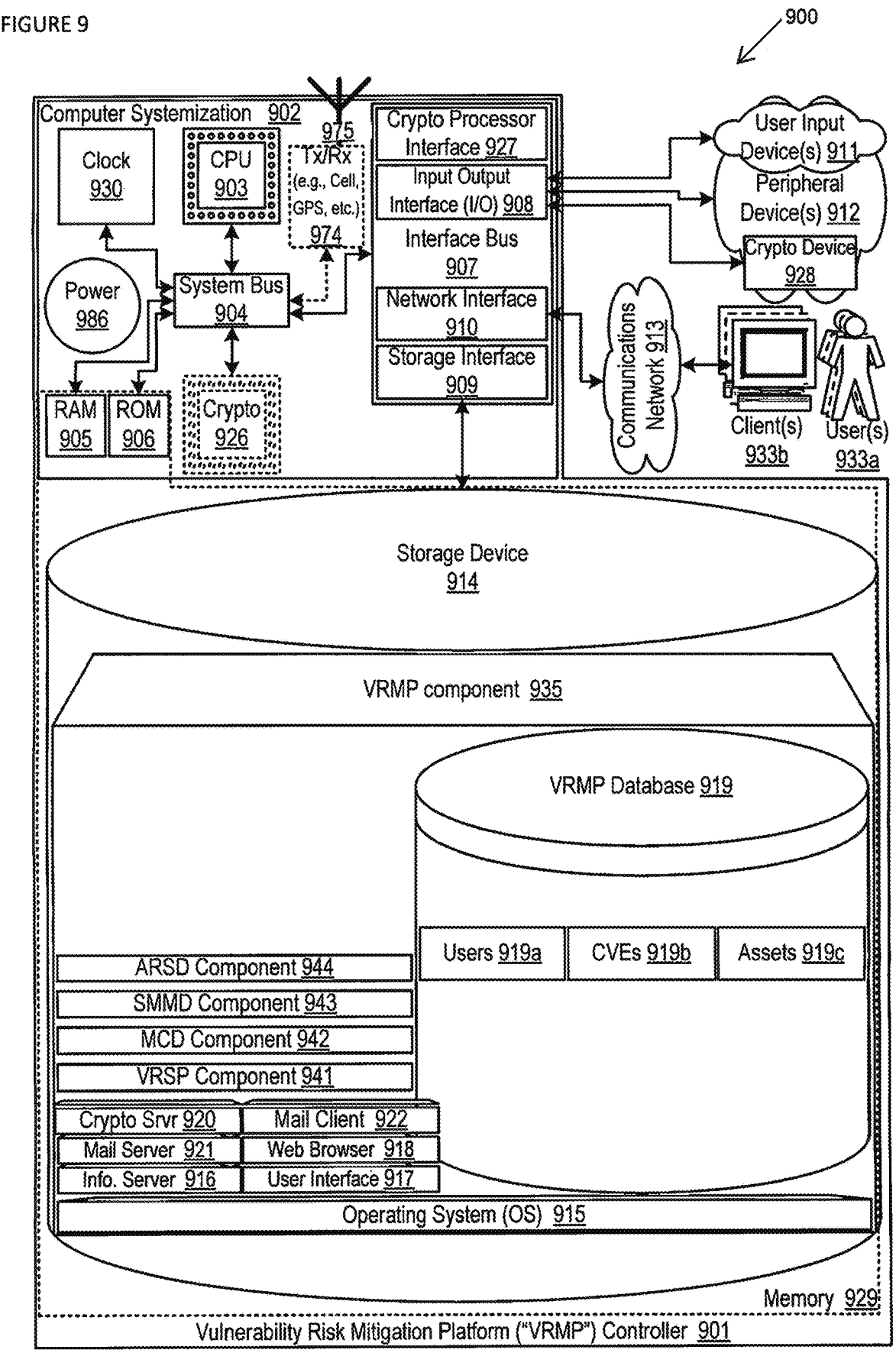
FIG. 9 is a block diagram illustrating aspects of a VRMP controller implemented in accordance with the present disclosure.

FIG. 9 is a block diagram illustrating system 900 implemented in accordance with aspects of the present disclosure to provide an augmented vulnerability risk score and unified vulnerability risk information related to assets. System 900 includes VRMP controller 901. According to aspects of the present disclosure, VRMP controller 901 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the VRMP controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The VRMP controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the VRMP controller to determine its location)); Broadcom BCM4329FKUBG transceiver chip (e.g., providing 802.11n, Bluetooth 2.1+EDR, FM, etc.); a Broadcom BCM47501UB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the VRMP controller and beyond through various interfaces. Should processing requirements dictate a greater amount speed and/or capacity, distributed processors (e.g., Distributed VRMP), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the VRMP may be achieved by implementing a microcontroller such as CAST's R8051XC2 microcontroller; Intel's MCS 51 (i.e., 8051 microcontroller); and/or the like. Also, to implement certain features of the VRMP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the VRMP component collection (distributed or otherwise) and/or features may be implemented via the microprocessor and/or via embedded components; e.g., via ASIC, coprocessor, DSP, FPGA, and/or the like. Alternately, some implementations of the VRMP may be implemented with embedded components that are configured and used to achieve a variety of features or signal processing.

Depending on the particular implementation, the embedded components may include software solutions, hardware solutions, and/or some combination of both hardware/software solutions. For example, VRMP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the VRMP features. A hierarchy of programmable interconnects allow logic blocks to be interconnected as needed by the VRMP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the VRMP may be developed on regular FPGAs and then migrated into a fixed version that more resembles ASIC implementations. Alternate or coordinating implementations may migrate VRMP controller features to a final ASIC instead of or in addition to FPGAs. Depending on the implementation all of the aforementioned embedded components and microprocessors may be considered the "CPU" and/or "processor" for the VRMP.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the VRMP thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the VRMP controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed VRMP), architectures may similarly be employed to pool, load balance, and/or otherwise increase the communicative bandwidth required by the VRMP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the VRMP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the VRMP controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the VRMP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400)

line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the VRMP controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blu-ray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the VRMP component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the VRMP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the VRMP controller to communicate with other entities through a communications network 913. Various communication protocols may be used by the VRMP controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the VRMP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the VRMP database 919, operating systems, other program components, user interfaces, Web browsers, and/or the like.

Access to the VRMP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the VRMP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the VRMP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer, Mozilla FireFox, Google Chrome, Netscape Navigator, etc. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the VRMP enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the VRMP.

Access to the VRMP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the VRMP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the VRMP component to engage in secure transactions if so desired. The cryptographic component facilitates the secure accessing of resources on the VRMP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The VRMP Database

The VRMP database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the VRMP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the VRMP database is implemented as a data structure, the use of the VRMP database 919 may be integrated into another component such as the VRMP component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-c. A users table 919a includes fields such as, but not limited to: a userID, userName, userType, userPreferences, userReports, and/or the like. The users table may support and/or track multiple entity accounts on a VRMP. A Common Vulnerabilities and Exposures (CVEs) table 919b includes fields such as, but not limited to: CVE_ID, CVE_Name, CVE_BaseVulnerabilityRiskScore, CVE_AugmentedVulnerabilityRiskScore, CVE_AssociatedPublicExploitsData, CVE_AssociatedMalwareData, CVE_SocialMediaMentions, CVE_SocialMediaMentionsRiskScore, CVE_AffectedAssetsIDs, and/or the like. An assets table 919c includes fields such as, but not limited to: assetID, assetOpenPorts, assetInfrastructureFunction, assetCIA_Values, assetRiskScore, and/or the like.

In one embodiment, the VRMP database may interact with other database systems. For example, employing a distributed database system, queries and data access by search VRMP component may treat the combination of the VRMP database, an integrated data security layer database as a single database entity.

In one embodiment, user programs may contain various user interface primitives, which may serve to update the VRMP. Also, various accounts may require custom database tables depending upon the environments and the types of clients the VRMP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-c. The VRMP may be configured to keep track of various settings, inputs, and parameters via database controllers.

The VRMP database may communicate to and/or with other components in a component collection, including itself, and/or facilities of the like. Most frequently, the VRMP database communicates with the VRMP component, other program components, and/or the like. The database may contain, retain, and provide information regarding other nodes and data.

The VRMPs

The VRMP component 935 may be a stored program component that may be executed by a CPU. In one embodiment, the VRMP component may incorporate any and/or all combinations of the aspects of the VRMP that will be discussed below with respect to FIGS. 1-8. As such, the VRMP affects accessing, obtaining and the provision of information, services, transactions, and/or the like across various communications networks. The features and embodiments of the VRMP discussed herein increase network efficiency by reducing data transfer requirements [through] the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the VRMP's features and facilities, and in many cases reduce the costs, energy consumption/requirements, and extend the life of VRMP's underlying infrastructure; this has the added benefit of making the VRMP more reliable. Similarly, many of the features and mechanisms are designed to be easier for users to use and access, thereby broadening the audience that may enjoy/employ and exploit the feature sets of the VRMP; such ease of use also helps to increase the reliability of the VRMP. In addition, the feature sets include heightened security as noted via the cryptographic components 920, 926, 928 and throughout, making access to the features and data more reliable and secure.

The VRMP transforms vulnerability risk info request, malware correlation analysis request, social media mentions analysis request, and, asset risk analysis request inputs via VRMP components, such as vulnerability risk score providing (VRSP) component 941, malware correlation determining (MCD) component 942, social media mentions determining (SMMD) component 943, and, asset risk score determining (ARSD) component 944, into vulnerability risk information, CVE data, social media mentions risk scores, and, asset risk score outputs.

The VRMP component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the VRMP server employs a cryptographic server to encrypt and decrypt communications. The VRMP component may communicate to and/or with other components in a component collection, including itself, and/or facilities of the like. Most frequently, the VRMP component communicates with the VRMP database, operating systems, other program components, and/or the like. The VRMP may contain, communicate, generate, obtain, and/or provide program component, system, user, and/or data communications, requests, and/or responses.

Distributed VRMPs

The structure and/or operation of any of the VRMP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the VRMP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the VRMP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
/ set ip address and port to listen to for incoming data
address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message do {
    $input=" ";
    $input=socket_read($client, 1024);
    $data.=$input;
} while($input !=" ");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI. doc/referenceguide295.htm and other parser implementations:

http://publib.boulder.ibm.com/infocenter/tivihelp/v2r1/index.jsp?topic=/com.ibm.IBMDI. doc/referenceguide259.htm all of which are hereby expressly incorporated by reference.

VRMP Logic

Figure 1:
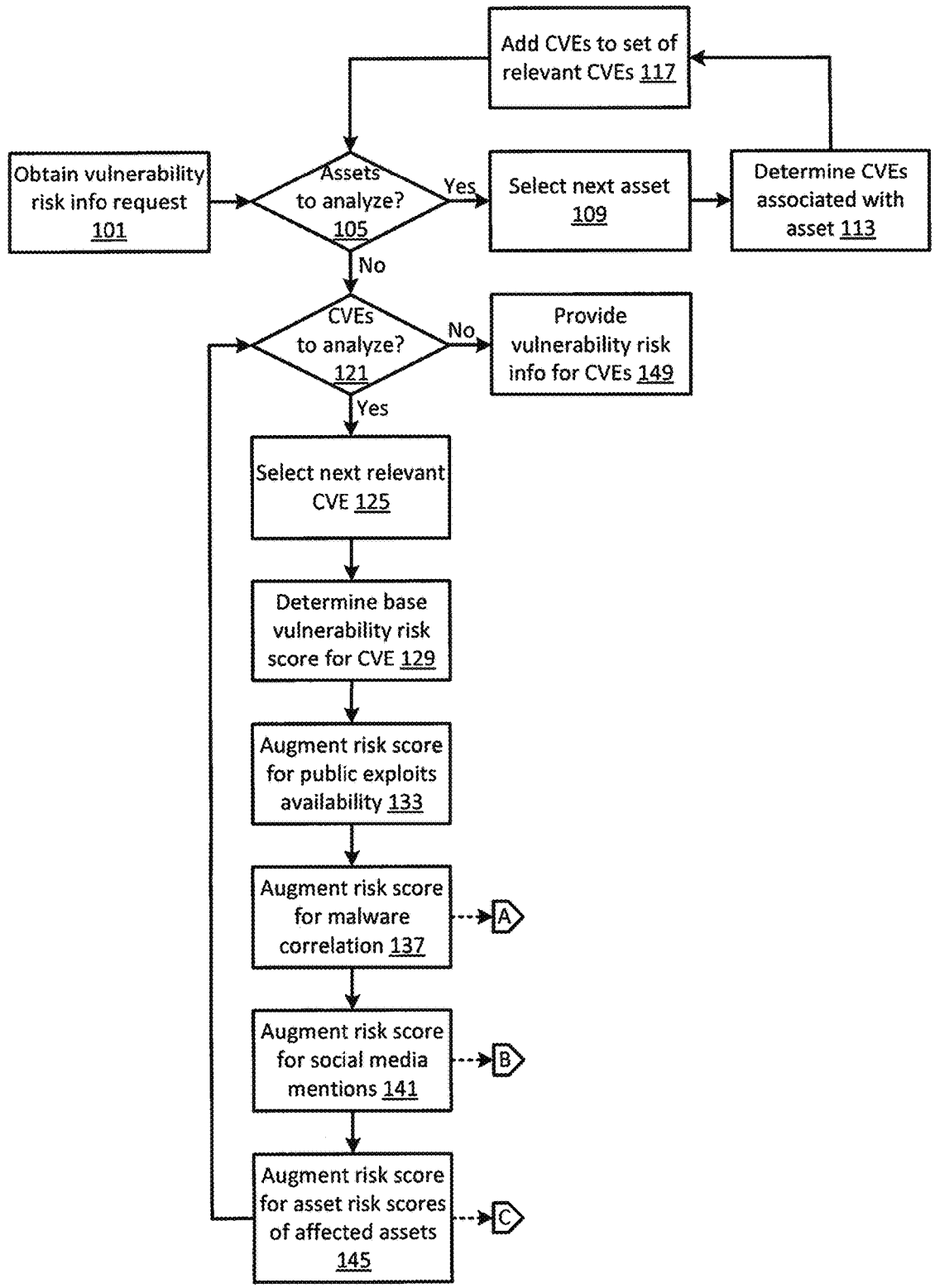
FIG. 1 is a logic flow diagram illustrating embodiments of a vulnerability risk score providing (VRSP) component of the VRMP.

FIG. 1 is a logic flow diagram illustrating embodiments of a VRSP component of the VRMP, such as VRSP component 941. In FIG. 1, a vulnerability risk info request may be obtained at 101. For example, the vulnerability risk info request may be received to obtain vulnerability risk information for an entity's (e.g., an individual's, a company's, an organization's, etc.'s) network environment. In one specific implementation, the vulnerability risk info request may be received from a user, such as one or more of users 933a shown in FIG. 9. The vulnerability risk info request may be made by the user using a graphical user interface (GUI of a computer system,), such as user input device 911 shown in FIG. 9, via a website, an application, etc.

At 105, a determination may be made as to whether there are assets to analyze. In various embodiments, an asset may refer to any asset that may include a vulnerability that may be exploited. For example, an asset as used herein may refer to a physical machine, a virtual machine, an application, a software program, a software program add on, and/or the like. In some aspects of the present disclosure, any asset (e.g., any asset that is part of the network environment) may be analyzed. In other aspects, a subset of assets may be specified to be analyzed. For example, the subset of assets may include assets selected by the user, and/or assets of a predetermined type. In some aspects, a determination as to whether there are assets to analyze may include determining whether there remain assets to be analyzed. In some aspects, the assets to analyze are included in a list of assets to be analyzed, and determining whether there remain assets to be analyzed comprises determining if there are any assets remaining in the list of assets to be analyzed.

If there do not remain assets to analyze, execution of the logic flow continues to 121. If there remain assets to analyze, the next asset may be selected for analysis at 109. In some aspects, the selection of the next asset may be based on a determined value, importance, priority, etc., of the assets. The determined value, importance, priority, etc., of the assets may be based on the Confidentiality, Integrity and Availability (CIA) values of the assets. CIA values are discussed in more depth below. At 113, CVEs associated with the selected asset may be determined. For example, a security vulnerability and/or exposure may be associated with a CVE data record having a CVE identifier (CVE ID). In some aspects, the asset's identifier (e.g., identifier associated with the asset's infrastructure function within the network environment, identifier associated with the application, etc.) may be utilized to retrieve a set of associated CVE IDs from a database. At 117, the determined CVEs may be added to a set of relevant CVEs. In some aspects, the set of relevant CVEs may be included in a list of CVE IDs. For example, the set of relevant CVEs may include CVEs that may be present in the network environment that includes the selected asset. In some aspects, the selected asset may be removed from the list of assets to be analyzed. Execution of the logic flow then proceeds to 105.

At 105, if it is determined that there do not remain assets to analyze, a determination may be made at 121 whether there remain relevant CVEs to analyze. In some aspects, any relevant CVE may be analyzed. In other aspects, a subset of relevant CVEs may be specified to be analyzed. For example, the subset of relevant CVEs may include relevant CVEs selected by the user, and/or relevant CVEs of a predetermined type.

If there remain relevant CVEs to analyze, the next relevant CVE may be selected for analysis at 125. In some aspects, the selection of the next relevant CVE may be based on a vulnerability risk calculation. A base vulnerability risk score (VRS) for the selected CVE may be determined at 129. In some aspects, a Common Vulnerability Scoring System (CVSS) score may be used as the base vulnerability risk score. For example, the National Vulnerability Database (NVD) CVSS v3 Calculator may be used to calculate the CVSS score for the CVE. Those of ordinary skill in the art would understand how the NVD CVSS v3 Calculator may be used to calculate the CVSS score for the CVE. In some aspects, the base VRS may be another standardized vulnerability score that may be used to maintain continuity with legacy vulnerability risk calculation systems.

At various steps, the base VRS for the CVE may be augmented based on various different factors. For example, in one embodiment, an augmented vulnerability risk score for the CVE may be calculated in accordance with the following augmented VRS formula:

$$\text{augmented VRS} = \text{function (weight1*(base VRS);} \\ \text{weight2*(public exploits availability score);} \\ \text{weight3*(malware correlation score); weight4*} \\ \text{(social media mentions risk score); weight5*} \\ \text{(asset risk score))} \quad (1)$$

In the above augmented VRS formula (1), various factors (e.g., base VRS, public exploits availability score, malware correlation score, social media mentions risk score, asset risk score) may be weighted and evaluated using a specified function (e.g., sum of weighted factors) to determine the augmented VRS for the CVE. In some aspects, the weight factors may be predetermined and may be calculated using machine learning analysis.

At 133, the base VRS for the CVE may be augmented based on public exploits availability. For example, a public exploit may be available to take advantage of a security vulnerability described by the CVE to compromise assets. In some aspects, a database may be queried to retrieve a set of public exploits associated with the CVE ID of the CVE. For example, a SQL database may be queried using SQL commands to retrieve a set of public exploits associated with the CVE ID of the CVE. The base vulnerability risk score for the CVE may be augmented based on the retrieved set of public exploits. In various aspects, the base vulnerability risk score for the CVE may be augmented based on any one or more of the number of available public exploits, ease of use of available public exploits, length of time that public exploits have been available, and/or the like. For example, a public exploits availability score may be calculated as the number of available public exploits. In one embodiment, the augmented vulnerability risk score for the CVE may be calculated in accordance with augmented VRS formula (1).

Figure 2:
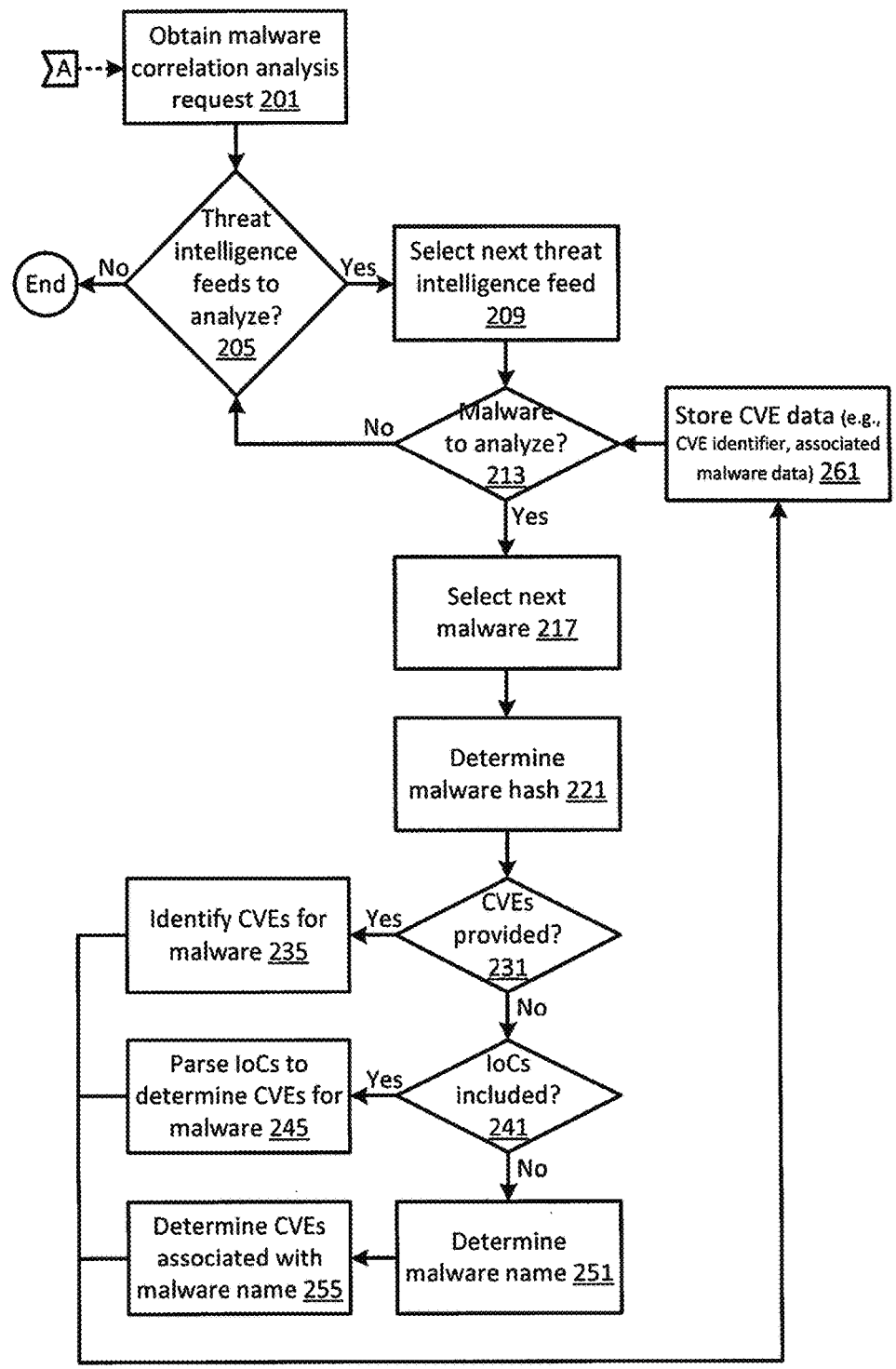
FIG. 2 is a logic flow diagram illustrating embodiments of a malware correlation determining (MCD) component of the VRMP.

At 137, the base VRS for the CVE may be augmented based on malware correlation. For example, a malware program may be available that correlates with a security vulnerability described by the CVE to compromise assets. In some aspects, a database may be queried (e.g., via REST API) to retrieve a set of correlated malware associated with the CVE ID of the CVE. FIG. 2 illustrates a logic flow diagram in accordance with aspects of the present disclosure that provides additional details regarding how malware is correlated with CVE IDs. The base vulnerability risk score for the CVE may be augmented based on the retrieved set of malware. In various aspects, the base vulnerability risk score for the CVE may be augmented based on any one or more of the number of correlated malware programs, ease of use of correlated malware, length of time that correlated malware has been available, and/or the like. For example, in one aspect, a malware correlation score may be calculated as the number of months the correlated malware has been available. In one embodiment, the augmented vulnerability risk score for the CVE may be calculated in accordance with the above augmented VRS formula (1).

Figure 3:
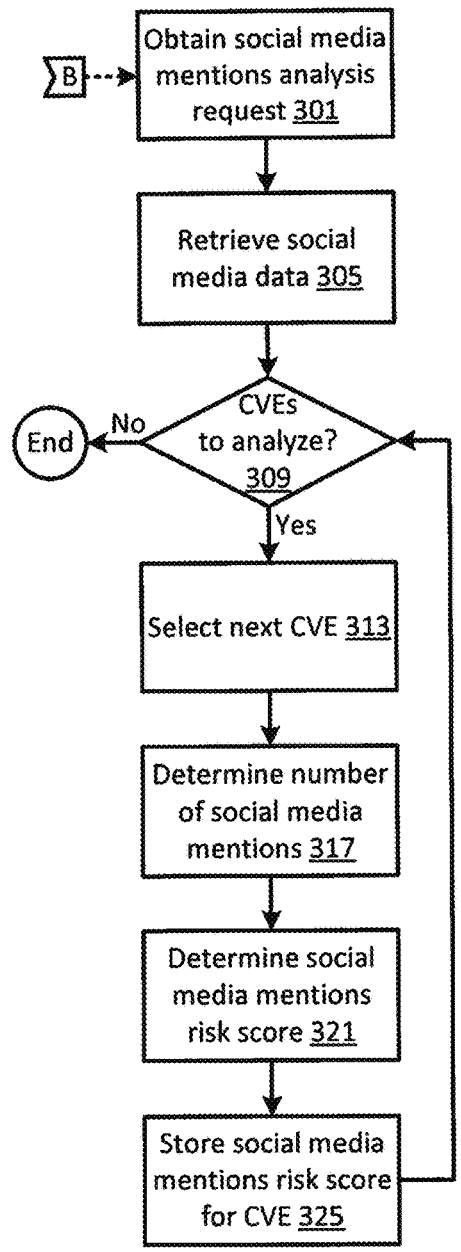
FIG. 3 is a logic flow diagram illustrating embodiments of a social media mentions determining (SMMD) component of the VRMP.

Referring back to FIG. 1, at 141, the base VRS for the CVE may be augmented based on social media mentions. As used herein, social media may refer any one or more of available social media platforms such as Twitter, Facebook, Instagram, Reddit, etc. Although the present disclosure primarily refers to Twitter, it is noted that the methods and techniques discussed herein may be equally applicable to any social media platform, individually or in combination. As such, the present disclosure should not be construed as limited to Twitter. For example, social media mentions may include chatter regarding a security vulnerability described by the CVE. The mentions and the chatter may be included in tweets, posts, comments, and/or any information submitted by a user of the social media platform. In one aspect, a database may be queried to retrieve a social media mentions risk score for the CVE, and the base vulnerability risk score for the CVE may be augmented based on the retrieved social media mentions risk score. FIG. 3 illustrates a logic flow diagram in accordance with aspects of the present disclosure that provides additional details regarding how a social media mentions risk score may be determined. The base vulnerability risk score for the CVE may be augmented based on the determined social media mentions risk scores. In one embodiment, the augmented vulnerability risk score for the CVE may be calculated in accordance with the above augmented VRS formula (1).

Figure 4:
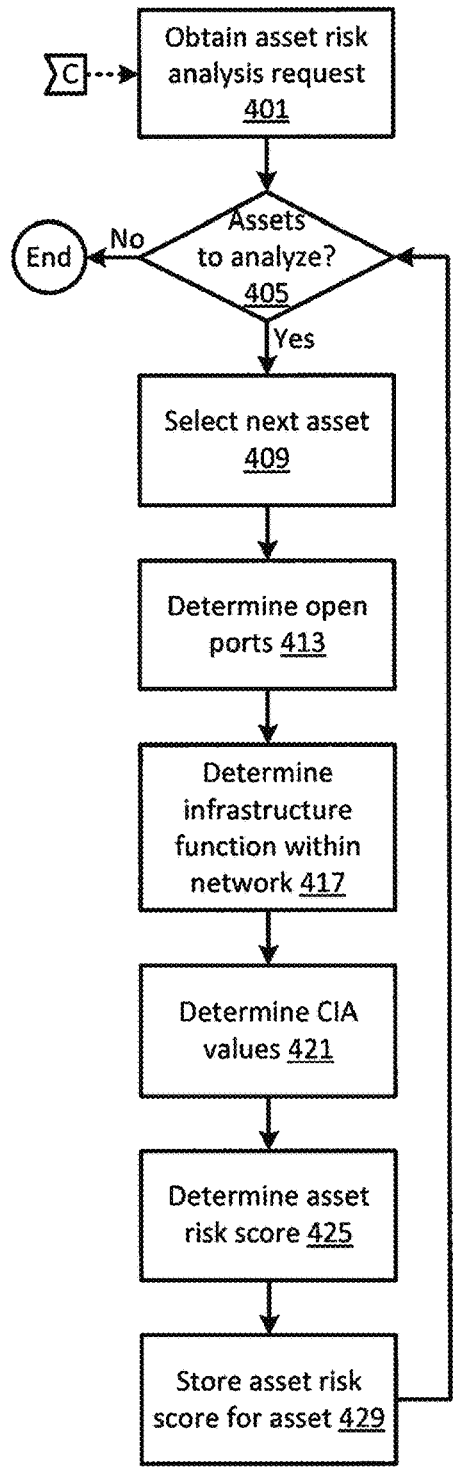
FIG. 4 is a logic flow diagram illustrating embodiments of an asset risk score determining (ARSD) component of the VRMP.

Referring back to FIG. 1, at 145, the base VRS for the CVE may be augmented based on asset risk scores of assets that may be affected by (e.g., compromised via) a security vulnerability described by the CVE. In one aspect, a database may be queried to retrieve asset risk scores of assets affected by the CVE, and the base vulnerability risk score for the CVE may be augmented based on the retrieved asset risk scores. In some aspects, a weighted average of the retrieved asset risk scores may be used to calculate an overall asset risk score. FIG. 4 illustrates a logic flow diagram in accordance with aspects of the present disclosure that provides additional details regarding how an asset risk score is determined. In one embodiment, the augmented vulnerability risk score for the CVE may be calculated in accordance with the above augmented VRS formula (1).

Referring back to FIG. 1, at 121, if there do not remain relevant CVEs to analyze, vulnerability risk information for relevant CVEs may be provided at 149, in response to the vulnerability risk info request obtained at 101. For example, vulnerability risk information may include at least one of a description of relevant CVEs, an indicator of risk associated with each CVE (e.g., red for high, yellow for medium, and green for low), priority associated with patching each CVE, the number of assets affected by each CVE, and/or the like. FIGS. 5-8, discussed in more detail below, provide additional details regarding vulnerability risk information that may be provided. In various aspects, vulnerability risk information may be provided to the user via a website, application, and/or the like.

FIG. 2 is a logic flow diagram illustrating embodiments of a MCD component, such as MCD component 942, of the VRMP. In FIG. 2, a malware correlation analysis request may be obtained at 201. For example, the malware correlation analysis request may be generated periodically, at a specific interval by the VRMP to analyze threat intelligence feeds and determine CVE data. For example, the malware correlation analysis request may be generated every day, every hour, at some specific interval, or at some specific time of the day. In another example, the malware correlation analysis request may be generated when new threat intelligence feed data is provided to the VRMP.

A determination may be made at 205 whether there remain threat intelligence feeds to analyze. In some aspects, determining whether there remain threat intelligence feeds to analyze may include searching a list of intelligence feeds. In aspects, the list of intelligence may be continuously updated. In one aspect, any available threat intelligence feed (e.g., from various commercial and open source sources) may be analyzed. If there remain threat intelligence feeds to analyze, the next threat intelligence feed may be selected for analysis at 209.

A determination may be made at 213 whether there remain malware (e.g., malware records) in the selected threat intelligence feed to analyze. In one aspect, any malware in the selected threat intelligence feed may be analyzed. If there remain malware to analyze, the next malware may be selected for analysis at 217.

At 221, a malware hash for the selected malware may be determined. The malware hash may identify specific malware (e.g., based on a hash of the malware's binary file). In one aspect, the selected malware record may be parsed (e.g., via an XML parser) to determine the malware hash.

At 231, a determination may be made as to whether the selected threat intelligence feed provides CVEs associated with the selected malware. If CVEs are provided by the feed, CVEs for the selected malware may be identified at 235. In one aspect, the selected malware record may be parsed (e.g., via an XML parser) to determine CVEs (e.g., CVE IDs) for the selected malware.

If CVEs are not provided by the feed, a determination may be made at 241 as to whether the selected threat intelligence feed includes indicators of compromise (IoCs) for the selected malware. IoCs may refer to artifacts left on a computerized system that may indicate a computer intrusion, and may include malware hashes, signatures, URLs, IP addresses, etc. If IoCs are provided by the feed, IoCs for the selected malware may be parsed to determine CVEs for the selected malware at 245. In one aspect, IoCs provided in the selected malware record may be parsed (e.g., via an XML parser) in accordance with an OpenIOC schema to determine CVEs for the selected malware.

If IoCs are not included in the feed, malware name of the selected malware may be determined at 251. In one aspect, the malware name may be determined based on the malware hash by querying a database. In some aspects, the database may be a private, or public database (e.g., VirusTotal database) that may correlate a hash of a malware with the malware name. At 225, CVEs associated with the malware name may be determined. In some aspects, a search may be conducted base on the malware name may be used to search a database for CVEs associated with the selected malware.

At 261, CVE data associated with the selected malware may be stored in memory. In one aspect, information regarding the selected malware may be associated (e.g., in CVEs database 919b shown in FIG. 9) with CVEs associated with the selected malware. For example, malware hash, malware name, other data regarding malware provided in the selected threat intelligence feed, and/or the like may be associated with CVE IDs of CVEs associated with the selected malware. effusive FIG. 3 is a logic flow diagram illustrating embodiments of a SMMD component, such as SMMD component 943, of the VRMP. In FIG. 3, a social media mentions analysis request may be obtained at 301. For example, the social media mentions analysis request may be generated periodically by the VRMP to analyze social media data and determine social media mentions risk scores for CVEs. For example, the social media mentions analysis request may be generated every day, every hour, at some specific interval, or at some specific time of the day.

At 305, social media data may be retrieved. For example, social media data may include Twitter data. In some aspects of the present disclosure, a bot looking for social media mentions associated with CVEs may be utilized to obtain social media data and/or to associate social media data with the CVE ID of the CVE mentioned. Those of skill in the art would readily appreciate that there are several implementations of a bot that may be employed, such as a crawler or a Twitterbot, the implementations of which are well known.

A determination may be made at 309 whether there remain CVEs to analyze. In one implementation, any CVE may be analyzed. If there remain CVEs to analyze, the next CVE may be selected for analysis at 313. The number of social media mentions for the selected CVE may be determined at 317. For example, the number of tweets, the number of posts, and/or the number of comments making mentions associated with the selected CVE may be determined. In one aspect, the retrieved social media data may be analyzed to determine the number of social media mentions (e.g., based on a name associated with the selected CVE).

At 321, a social media mentions risk score for the selected CVE may be determined. In various implementations, the social media mentions risk score may be calculated based on any one or more of the number of social media mentions, the time frame (e.g., how recent, duration) associated with social media mentions, geographic dispersion of social media mentions, and/or the like. For example, the social media mentions risk score may be calculated as 0 (e.g., low) if the selected CVE has 0 or 1 social media mentions, as 1 (e.g., medium) if the selected CVE has between 2 and 17 social media mentions, as 2 (e.g., high) if the selected CVE has between 18 and 37 social media mentions, or as 3 (e.g., urgent) if the selected CVE has 38 or more social media mentions. In some aspects, social media mentions may refer to actual mentions, or may refer to median mentions.

At 325, the social media mentions risk score for the selected CVE may be stored. For example, the social media mentions risk score may be stored in CVEs database 919$b$ shown in FIG. 9, and may be associated with the CVE ID of the selected CVE.

FIG. 4 is a logic flow diagram illustrating embodiments of an ARSD component, such as ARSD component 944, of the VRMP. In FIG. 4, an asset risk analysis request may be obtained at 401. For example, the asset risk analysis request may be generated when initiating analysis of an entity's network environment.

A determination may be made at 405 whether there remain assets to analyze. In one implementation, any asset (e.g., any asset that is part of the network environment) may be analyzed. If there remain assets to analyze, the next asset may be selected for analysis at 409. Open ports associated with the selected asset may be determined at 413. In some aspects, a network enumeration utility may be used to determine open ports. For example, a network scanner such as Nmap or Nessus may be used to determine open ports. In another aspect, configuration data associated with the selected asset may be examined to determine open ports.

At 417, the selected asset's infrastructure function within the network environment may be determined. For example, an infrastructure function may be a Domain Controller, DNS server, LDAP server, file server, and/or the like. In some aspects, a rule-based expert system may be utilized to determine the selected asset's infrastructure function based on the open ports associated with the selected asset.

CIA values associated with the selected asset may be determined at 421. As used herein, confidentiality may refer to controlling access to information to limit such access to appropriate entities, integrity may refer to the assurance that the information is trustworthy and accurate, and availability may refer to a scheme for guaranteeing reliable access to the information by appropriate entities. In some aspects, a rule-based expert system may be utilized to determine the selected asset's CIA values based on the selected asset's infrastructure function and/or the open ports associated with the selected asset. At 425, an asset risk score for the selected asset may be determined. In one implementation the asset risk score may be calculated based on the CIA values. For example, the asset risk score may be a weighted average of the CIA values. The asset risk score for the selected asset may be stored at 429. In some aspects, the asset risk score may be stored in assets database 919$c$ shown in FIG. 9, and may be associated with the asset identifier (asset ID) of the selected asset.

VRMP UI/UX

Figure 5:
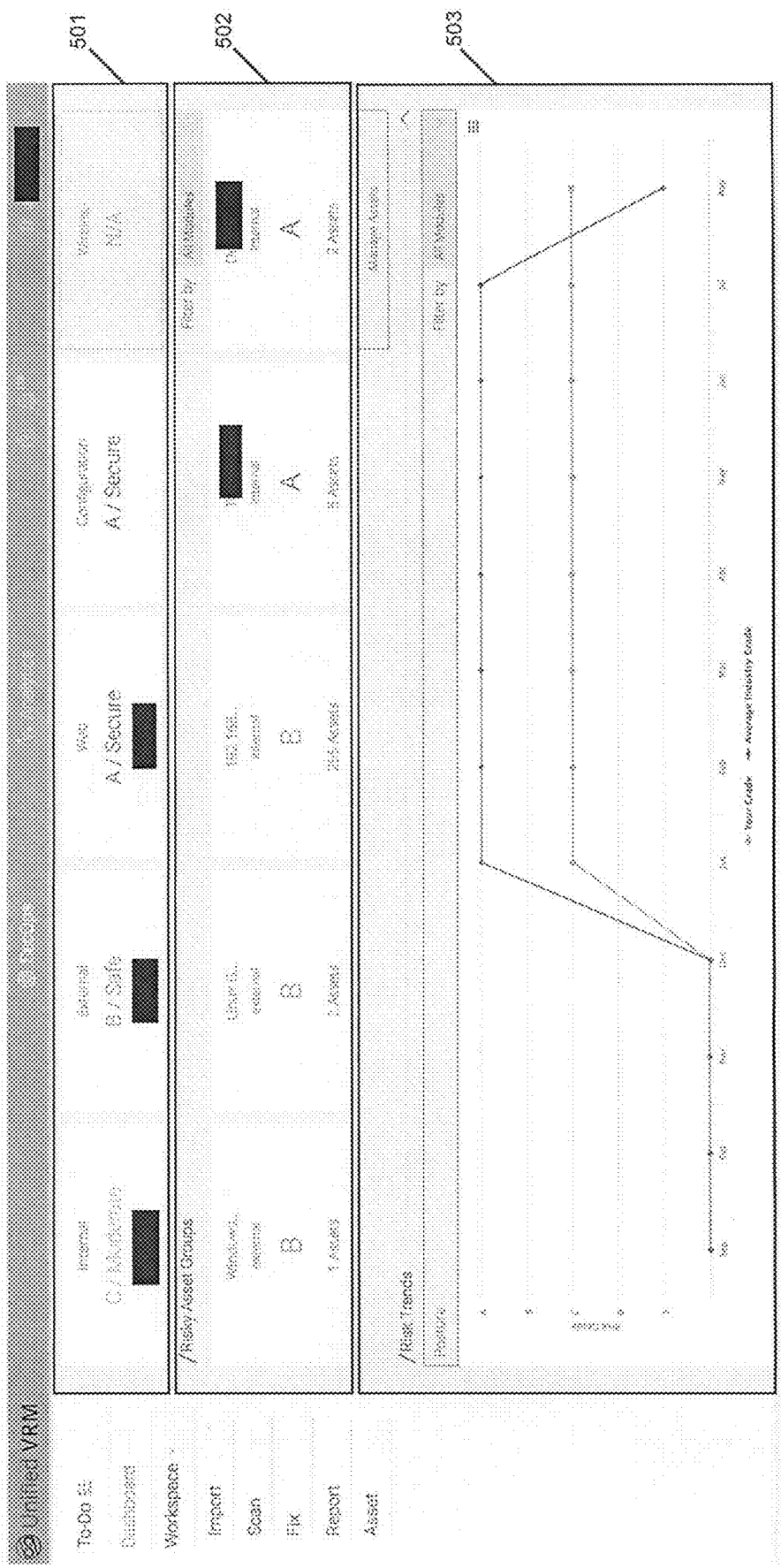
FIG. 5 is a screenshot diagram illustrating aspects of the VRMP implemented in accordance with the present disclosure.

FIG. 5 is a screenshot diagram illustrating aspects of the VRMP implemented in accordance with the present disclosure. FIG. 5 illustrates vulnerability risk information that may be provided to a user. The vulnerability risk information may be provided via a GUI adapted in accordance to the present disclosure to provide vulnerability risk information to a user. In FIG. 5, an entity's vulnerability risk scores 501 for certain types of assets are illustrated. In the illustrated example, the types of assets illustrated are internal, external, web, configuration, and wireless. FIG. 5 also shows a comparison 503 of the entity's vulnerability risk scores 501 with industry average risk scores. Risky asset groups 502 are also illustrated. In the illustrated example, risky asset groups 502 are filtered by asset type.

Figure 6:
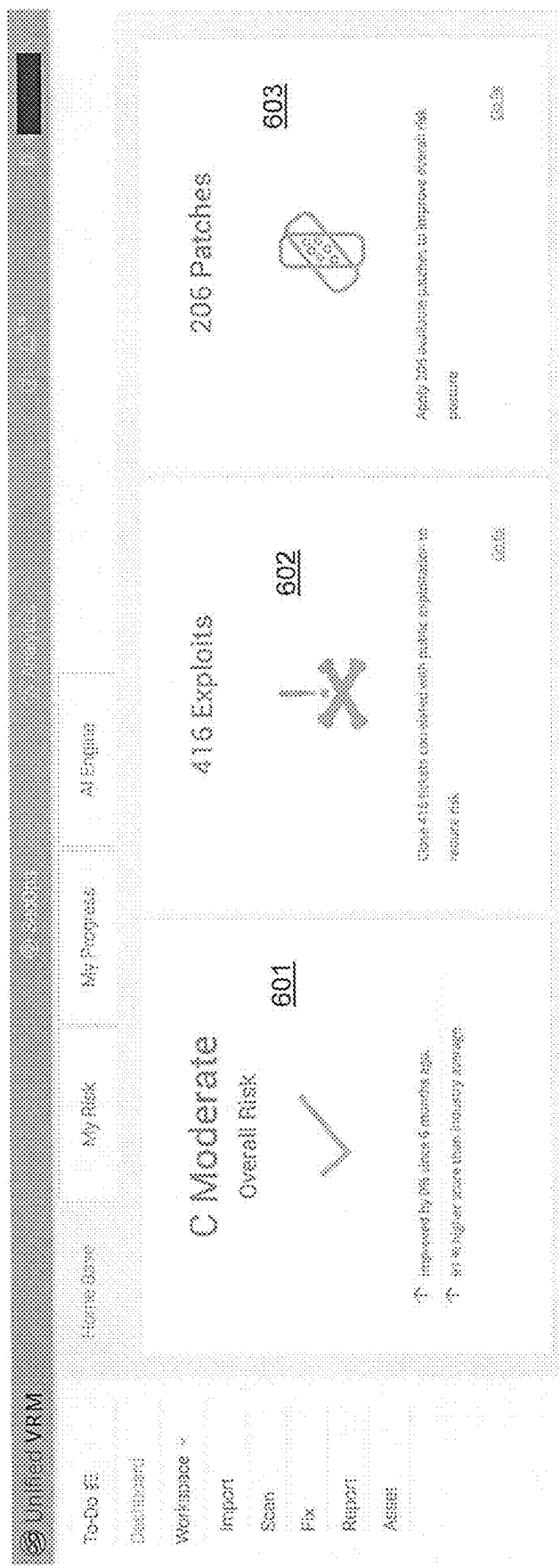
FIG. 6 is a screenshot diagram illustrating aspects of the VRMP implemented in accordance with the present disclosure.

FIG. 6 is a screenshot diagram illustrating aspects of the VRMP implemented in accordance with the present disclosure. FIG. 6 illustrates vulnerability risk information that may be provided to a user. The vulnerability risk information may be provided via a GUI adapted in accordance to the present disclosure to provide vulnerability risk information to a user. As shown, the provided vulnerability risk information may include overall vulnerability risk score 601. Further, information regarding overall vulnerability risk score 601, such as percentage improved and comparison with industry average, may be included. Element 602 may indicate the number of exploits associated with CVEs associated with the asset. Element 206 may indicate the number of patches available to be applied to reduce the overall risk. Links 604 and 605 provide a way for the user to take corrective measures to reduce vulnerability risk.

Figure 7:
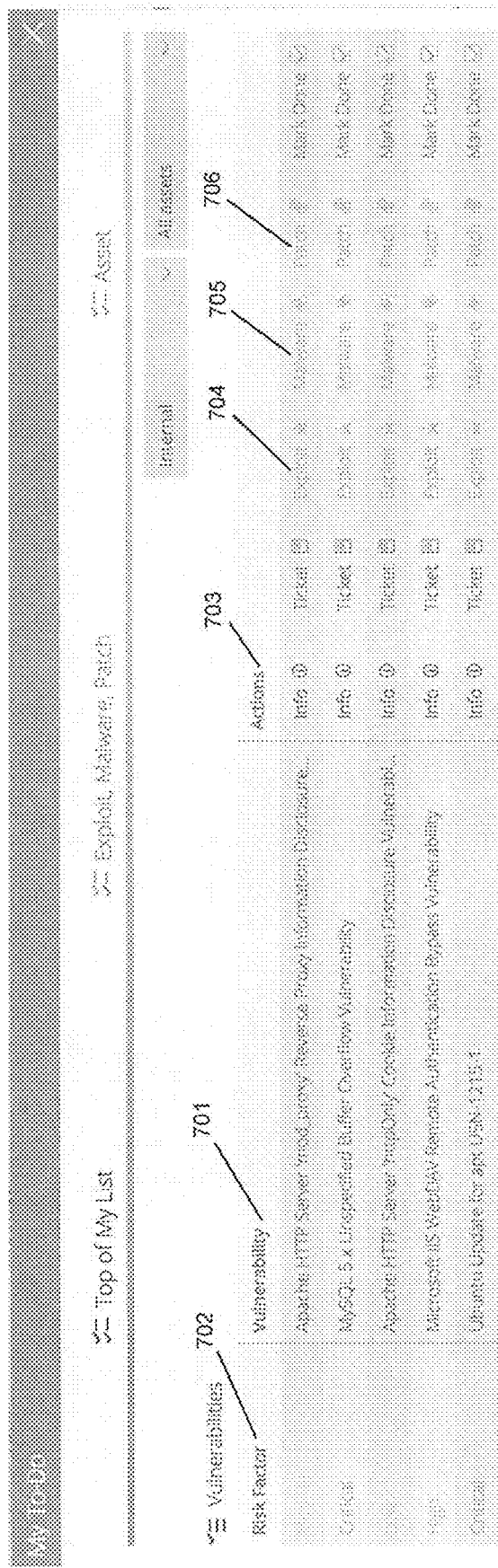
FIG. 7 is a screenshot diagram illustrating aspects of the VRMP implemented in accordance with the present disclosure.

FIG. 7 is a screenshot diagram illustrating aspects of the VRMP implemented in accordance with the present disclosure. FIG. 7 illustrates vulnerability risk information that may be provided to a user. The vulnerability risk information may be provided via a GUI adapted in accordance to the present disclosure to provide vulnerability risk information to a user. In FIG. 7, information regarding various vulnerabilities is shown. Such information includes description of the vulnerabilities 701, risk factor 702, which may indicate the vulnerability risk associated with the vulnerabilities, and further actions 703. Further actions 703 includes an indication 704 of whether there is an exploit available for the corresponding vulnerability. Further actions 703 also includes an indication 705 of whether there is a malware available for the corresponding vulnerability. Further actions 703 also includes an indication 706 of whether there is a patch available for the corresponding vulnerability. Further, as shown in this figure, the VRMP facilitates dealing with (e.g., open a ticket, apply a patch) the vulnerabilities by providing links that the user may select to take corrective action.

Figure 8:
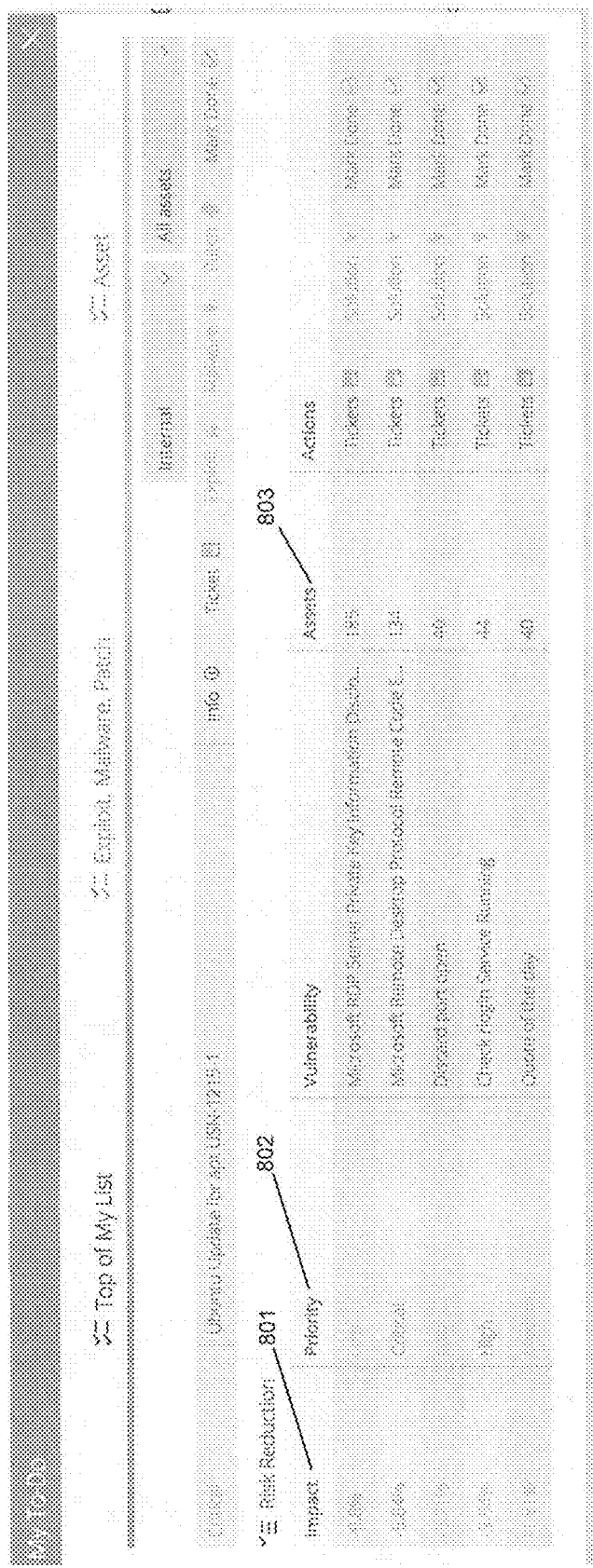
FIG. 8 is a screenshot diagram illustrating aspects of the VRMP implemented in accordance with the present disclosure.

FIG. 8 is a screenshot diagram illustrating aspects of the VRMP implemented in accordance with the present disclosure. FIG. 8 illustrates vulnerability risk information that may be provided to a user. The vulnerability risk information may be provided via a GUI adapted in accordance to the present disclosure to provide vulnerability risk information to a user. In FIG. 8, information regarding risk reduction for various vulnerabilities is shown. Such information also includes an indication 801 of the risk reduction impact of eliminating a corresponding vulnerability. Such information also includes an indication 802 of the priority associated with eliminating the corresponding vulnerability. Such information also includes an indication 803 of the number of assets affected by the corresponding vulnerability.

In order to address various issues and advance the art, the entirety of this application for VULNERABILITY RISK MITIGATION PLATFORM APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a VRMP individual and/or enterprise user, database configuration and/or relational model, data type, data transmission and/or network framework, syntax structure, and/or the like, various embodiments of the VRMP, may be implemented that enable a great deal of flexibility and customization. For example, aspects of the VRMP may be adapted for mitigating various types of vulnerabilities. While various embodiments and discussions of the VRMP have included vulnerability risk scores, however, it is to be understood that the embodiments described herein may be readily configured and/or customized for a wide variety of other applications and/or implementations.

What is claimed is:

1. A vulnerability risk mitigating apparatus, comprising:
a memory;
at least one processor disposed in communication with said memory, and configured to execute instructions stored in the memory, wherein the at least one processor is configured to execute the instructions to:
 obtain a request for vulnerability risk information associated with a network environment;
 determine a security vulnerability affecting assets associated with the network environment, wherein the assets comprise hardware and software resources accessible via the network environment;
 determine a base vulnerability risk score for the security vulnerability;
 augment the base vulnerability risk score based on at least one augmenting factor, wherein the at least one augmenting factor includes a social media mentions risk score corresponding to a number of social media mentions of the security vulnerability, wherein each mention included in the number of social media mentions is associated with a social media post that includes information corresponding to the security vulnerability;
 present vulnerability risk information regarding the security vulnerability at a graphical user interface, wherein the vulnerability risk information includes a vulnerability risk factor based on the augmented vulnerability risk score of the security vulnerability;
 determine one or more available patches to mitigate the security vulnerability;
 present one or more links corresponding to the one or more available patches via the graphical user interface; and
 correct the security vulnerability based on a selection of a link of the one or more links corresponding to a patch of the one or more available patches.

2. The apparatus of claim 1, wherein the at least one augmenting factor is selected from the group consisting of: a public exploits availability score, a malware correlation score, the social media mentions risk score, and an overall asset risk score, and wherein the configuration of the at least one processor to execute the instructions to augment the base vulnerability risk score includes configuration of the at least one processor to execute the instructions to:
 calculate the public exploits availability score for the security vulnerability;
 calculate the malware correlation score for the security vulnerability;
 calculate the social media mentions risk score for the security vulnerability; or calculate the overall asset risk score for the security vulnerability.

3. The apparatus of claim 2, wherein the configuration of the at least one processor to execute the instructions to calculate the social media mentions risk score includes configuration of the at least one processor to execute the instructions to:
   determine the number of social media mentions of the security vulnerability; and
   calculate the social media mentions risk score based on the determined number of social media mentions.

4. The apparatus of claim 3, wherein the number of social media mentions is one of a number of actual social media mentions and a median of social media mentions.

5. The apparatus of claim 2, wherein the configuration of the at least one processor to execute the instructions to calculate the public exploits availability score includes configuration of the at least one processor to execute the instructions to:
   query a database to retrieve information relating to at least one public exploit associated with an identifier of the security vulnerability;
   determine at least one public exploit factor from a set of public exploit factors including: a number of available public exploits associated with the identifier of the security vulnerability, ease of use of the available public exploits, and a length of time the public exploits have been available; and
   calculate the public exploits availability score based on the determined at least one public exploit factor.

6. The apparatus of claim 2, wherein the configuration of the at least one processor to execute the instructions to calculate the malware correlation score includes configuration of the at least one processor to execute the instructions to:
   query a database to retrieve information relating to at least one malware associated with an identifier of the security vulnerability;
   determine at least one malware factor from a set of malware factors including: a number of available malware associated with the identifier of the security vulnerability, ease of use of the available malware, and a length of time the malware have been available; and
   calculate the malware correlation score based on the determined at least one malware factor.

7. The apparatus of claim 2, wherein the configuration of the at least one processor to execute the instructions to calculate the overall asset risk score includes configuration of the at least one processor to execute the instructions to:
   query a database to retrieve asset risk scores of assets affected by the security vulnerability;
   calculate a weighted average of the retrieved asset risk scores of the assets affected by the security vulnerability; and
   calculate the overall asset risk score based on the weighted average.

8. The apparatus of claim 7, wherein the asset risk score of at least on asset affected by the security vulnerability is based on a confidentiality, integrity and availability (CIA) score of the affected asset based on at least one of an infrastructure function of the affected asset, and open ports of the affected asset.

9. The apparatus of claim 1, wherein the base vulnerability risk score for the security vulnerability is based on a common vulnerability scoring system (CVSS).

10. The apparatus of claim 1, wherein the configuration of the at least one processor to execute the instructions to determine the at least one security vulnerability affecting assets includes configuration of the at least one processor to execute instructions to identify common vulnerabilities and exposures (CVEs) associated with the affected assets.

11. The apparatus of claim 1, wherein the configuration of the at least one processor to execute the instructions to augment the base vulnerability risk score based on the at least one augmenting factor includes configuration of the at least one processor to execute instructions to apply a weighted average to the at least one augmenting factor.

12. A method of augmenting a base vulnerability risk score for a security vulnerability, the method comprising:
   obtaining a request for vulnerability risk information associated with a network environment;
   determining a security vulnerability affecting assets associated with the network environment, wherein the assets comprise hardware and software resources accessible via the network environment;
   determining a base vulnerability risk score for the security vulnerability;
   calculating an augmenting factor based on at least one of a public exploits availability score for the security vulnerability, a malware correlation score for the security vulnerability, a social media mentions risk score for the security vulnerability, the social media risk score corresponding to a number of social media mentions of the security vulnerability, and an asset risk score for the security vulnerability, wherein each mention included in the number of social media mentions is associated with a social media post that includes information corresponding to the security vulnerability;
   augmenting a base vulnerability risk score based on the augmenting factor;
   presenting vulnerability risk information regarding the security vulnerability at a graphical user interface, wherein the vulnerability risk information includes a vulnerability risk factor based on the augmented vulnerability risk score of the security vulnerability;
   determine one or more available patches to mitigate the security vulnerability;
   present one or more links corresponding to the one or more available patches via the graphical user interface; and
   correct the security vulnerability based on a selection of a link of the one or more links corresponding to a patch of the one or more available patches.

13. The method of claim 12, wherein the calculating the augmenting factor based on the social media mentions risk score includes:
   determining the number of social media mentions of the security vulnerability; and
   calculating the social media mentions risk score based on the determined number of social media mentions.

14. The method of claim 12, wherein the calculating the augmenting factor based on the public exploits availability score includes:
   querying a database to retrieve information relating to at least one public exploit associated with an identifier of the security vulnerability;
   determining at least one public exploit factor from a set of public exploit factors including: a number of available public exploits associated with the identifier of the security vulnerability, ease of use of the available public exploits, and a length of time the public exploits have been available; and
   calculating the public exploits availability score based on the determined at least one public exploit factor.

15. The method of claim 12, wherein the calculating the augmenting factor based on the malware correlation score includes:
- querying a database to retrieve information relating to at least one malware associated with an identifier of the security vulnerability;
- determining at least one malware factor from a set of malware factors including: a number of available malware associated with the identifier of the security vulnerability, ease of use of the available malware, and a length of time the malware have been available; and
- calculating the malware correlation score based on the determined at least one malware factor.

16. The method of claim 12, wherein the calculating the augmenting factor based on the overall asset risk score includes:
- querying a database to retrieve asset risk scores of assets affected by the security vulnerability;
- calculating a weighted average of the retrieved asset risk scores of the assets affected by the security vulnerability; and
- calculating the overall asset risk score based on the weighted average.

17. A social media mentions determining (SMMD) apparatus for calculating a social media mentions risk score (SMMRS), comprising:
- a memory;
- at least one processor disposed in communication with said memory, and configured to execute instructions stored in the memory, wherein the at least one processor is configured to execute the instructions to:
  - obtain a request for social media mentions analysis associated with a security vulnerability affecting assets of a network environment;
  - retrieve social media data, wherein the social media data includes social media mentions associated with the security vulnerability;
  - determine information related to the social media mentions associated with the security vulnerability, wherein the information related to the social media mentions is based on an identifier associated with the security vulnerability, and wherein each mention included in the number of social media mentions is associated with a social media post that includes information corresponding to the security vulnerability;
  - calculate the SMMRS based on the information related to the social media mentions, wherein the information related to the social media mentions includes a number of social media mentions of the security vulnerability and at least one of a duration associated with social media mentions, an indicator of how recent the social media mention is, and a geographic dispersion of the social media mentions;
  - determine one or more available patches to mitigate the security vulnerability;
  - present one or more links corresponding to the one or more available patches via the graphical user interface; and
  - correct the security vulnerability based on a selection of a link of the one or more links corresponding to a patch of the one or more available patches.

18. The apparatus of claim 17, wherein the SMMRS may be determined to be one of:
- a low SMMRS, when the information related to the social media mentions indicates that the security vulnerability is a first predetermined number of social media mentions;
- a medium SMMRS, when the information related to the social media mentions indicates that the security vulnerability is a second predetermined number of social media mentions;
- a high SMMRS, when the information related to the social media mentions indicates that the security vulnerability is a third predetermined number of social media mentions; and
- an urgent SMMRS, when the information related to the social media mentions indicates that the security vulnerability is a fourth predetermined number of social media mentions.

19. The apparatus of claim 17, wherein the number of social media mentions is one of a number of actual social media mentions, a median of social media mentions, a range of the number of actual social media mentions, and a range of the median of social media mentions.

20. The apparatus of claim 17, wherein the social media data is social media data from Twitter.

* * * * *